United States Patent
Sakurai

[15] 3,636,511
[45] Jan. 18, 1972

[54] DIRECTION INDICATING AND EMERGENCY SWITCH DEVICE FOR AUTOMOBILES

[72] Inventor: Yasuhiko Sakurai, Kariya-shi, Japan
[73] Assignee: Nippon Denso Kabushiki Kaisha, Kariya-shi, Japan
[22] Filed: Sept. 11, 1969
[21] Appl. No.: 857,013

[30] Foreign Application Priority Data

Oct. 8, 1968 Japan...................................43/87879
Apr. 25, 1969 Japan...................................44/38434

[52] U.S. Cl.............................................340/81, 340/251
[51] Int. Cl................................................................B60q 1/38
[58] Field of Search..............................................340/80, 81

[56] References Cited

UNITED STATES PATENTS 3,483,436  12/1969  Siiberg.............................340/81 UX
3,508,237  4/1970  Kimmelman......................340/51

Primary Examiner—John W. Caldwell
Assistant Examiner—Kenneth N. Leimer
Attorney—Cushman, Darby & Cushman

[57] ABSTRACT

In a direction indicating and hazard flasher device for automobiles comprising a power source, indicator means, including two groups of lamp loads, direction indicator and hazard switches connecting the indicator means to the power source through switching means, the improvement wherein the switching means comprises a first contact connected between the direction indicator switch and the power source, a switch actuator being energized from the power source for periodically actuating the first contact, a series circuit of a second normally closed contact and a current winding, the series circuit being connected in parallel with the first contact, and a voltage winding connected in parallel with the second normally closed contact, the second normally closed contact being opened by the current winding only when a current larger than a predetermined value is carried therethrough to either one of the lamp loads and being held in the open state by the voltage winding in cooperation with the current winding, whereby the lamp load is not flashed if the current through the current winding is smaller than the predetermined value due to some failure thereof.

2 Claims, 4 Drawing Figures

DIRECTION INDICATING AND EMERGENCY SWITCH DEVICE FOR AUTOMOBILES

FIELD OF THE INVENTION

This invention relates to an improved switch device in an automobile both for producing a direction indicating signal and for producing an emergency signal required when the automobile is stopped from running due to some fault or in similar cases.

DESCRIPTION OF THE PRIOR ART

Figure 1:
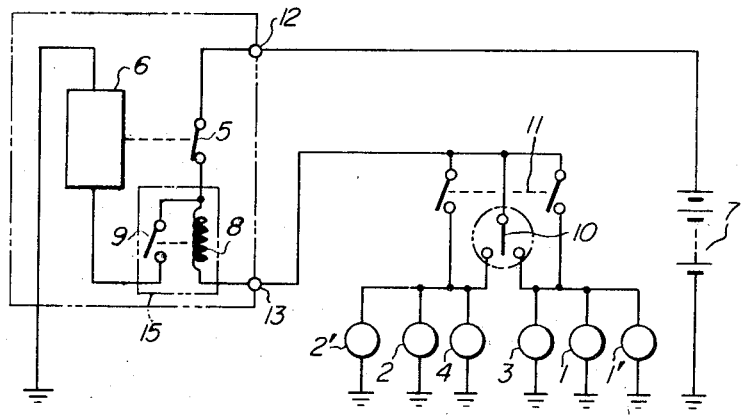
FIG. 1 shows a block diagram of the electric circuit of the switch device of the above-described type according to the prior art.

As shown in FIG. 1, the conventional switch device comprises a switch actuator 6 driving a normally closed contact 5, a normally open contact 9 and a current winding 8 for driving the contact 9, so that only when the load current flowing in the winding 8 is more than a predetermined value, the normally open contact 9 can be closed to operate the switch actuator 6 and thereby flash a right-hand group of direction indicator lights 1, 1', 3 or a left-hand group of direction indicator lights, 2, 2', 4 depending on the position of the direction switch 10. If one of the right-hand group of direction indicator lights 1, 1', 3 or the left-hand group of direction indicator lights 2, 2', 4 goes off by a fault, the load current is reduced to thereby cause the winding 8 to open the normally open contact 9 so that the switch actuator 6 is deenergized, thus indicating the failure of the said one direction indicator light. Also, in an emergency, an emergency switch 11 is closed to energize the switch actuator 6 and thereby to operate the normally closed contact 5 so that all the direction indicator lights are flashed.

However, the above-described conventional device has a disadvantage that the magnetomotive force of the current winding 8 is affected by the transient surge current which is several times as much as a steady-state current which flows into the direction indicator lights immediately after they are turned on and the winding 8 may close the normally open contact 9 to cause the switch actuator 6 to operate even when one of the direction indicator lights goes off. Especially in a three-light type direction indicator device in which the group of direction indicator lights on either side of the vehicle consists of three direction lights as shown in FIG. 1, the decrement of the load current caused by the failure of one of the direction indicator lights is only one-third of the steady-state current, and this results in a disadvantage that the detection of the failure of one of the direction indicator lights becomes very difficult because of the said surge current.

Another disadvantage peculiar to the foregoing prior art device arises from the fact that the disconnection of one direction indicator light is detected by the inactivation of the switch actuator 6 due to the decrease in the load current flowing in the current winding 8. In an emergency where the emergency switch 11 must be closed so as to flash all of the direction indicator lights, if a less number of direction indicator lights than a predetermined number are lit due to the damage of some of these lights or for any other reason, the remaining sound direction indicator lights will not be flashed and no emergency signal will be produced. Thus, according to the prior art, the generation of an emergency signal is rendered unreliable in order to ensure the proper function of detecting the failure of one of the direction indicator lights.

Still another disadvantage existing in the prior art device involves the following problem which occurs during the operation. Since the switch actuator 6 is connected with a power source 7 through the normally closed contact 5 and normally open contact 9, source voltage is applied to the switch actuator 6 during the switching operation thereof when the normally closed contact 5 is closed, and then the voltage drop sometimes becomes too great to properly operate the switch actuator 6 itself. Especially during an emergency, as all the direction indicator lights are brought into the load, the load is greatly increased, and this in turn causes a considerable drop of the voltage applied to the switch actuator 6, which might lead to the malfunction of the said actuator.

SUMMARY OF THE INVENTION

It is an object of the present invention to eliminate the foregoing disadvantages, and for this purpose, in view of the fact that the surge current in electric lights diminishes shortly after they are turned on, to construct the detector circuit for detecting the failure of the direction indicator lights in such a manner that the detector circuit is operated always after the direction indicator lights are turned on and always by a steady-state current in a direction indicator lights, thereby accomplishing the reliable detection of the failure of one of the direction indicator lights without influence of the surge current and disconnecting the detector circuit from the power source during the while the emergency switch is closed, so that the direction indicator lights are assuredly flashed even if the number of the lights is decreased to one.

According to the present invention, the failure of one direction indicator light may be reliably detected without being affected by the rush current and such detection is ensured over a wide voltage range in a three-light type direction indicator device. In addition to such an excellent merit, there is provided another high merit that as a normally closed contact 11' can be opened with the closure of the emergency switch 11 in an emergency the circuit constituted by a current winding 8 and a voltage winding 8' is disconnected from a power source 7 so as to enable all the direction indicator lights to be flashed regardless of number of the lights.

It is another object of the present invention to provide a direction indicating and emergency switch device for automobiles in which the detector for detecting the failure of the direction indicator lights is arranged so as to be operated always after the direction indicator lights are turned on and always by a steady-state current to thereby enable the failure of one of the direction indicator lights to be reliably detected over a wide voltage range even in a three-light type direction indicator device, and without suffering from any influence of the surge current. In such a switch device, the load interrupting switch is arranged to be driven by the source voltage during on-load periods to thereby ensure reliable operation even if the load of the power source becomes great as in the case of an emergency.

According to the present invention, the detection of the failure of one of the direction indicator lights may be reliably accomplished without influence of the rush current and such detection is possible over a wide voltage range even in a three-light type direction indicator device. In addition, power may be supplied to the switch actuator during the while the normally open contact for interrupting the load current is open or when no load is present, so that the switch actuator can drive the normally open contact in its no-load condition, namely at a maximum source voltage, thus ensuring the direction indicator lights to be flashed even if the load is very great as in the case of emergency.

DESCRIPTION OF THE PREFERRED EMBODIMENTS

The present invention will now be described more fully with respect to the preferred embodiments thereof shown in the accompanying drawings.

Figure 2:
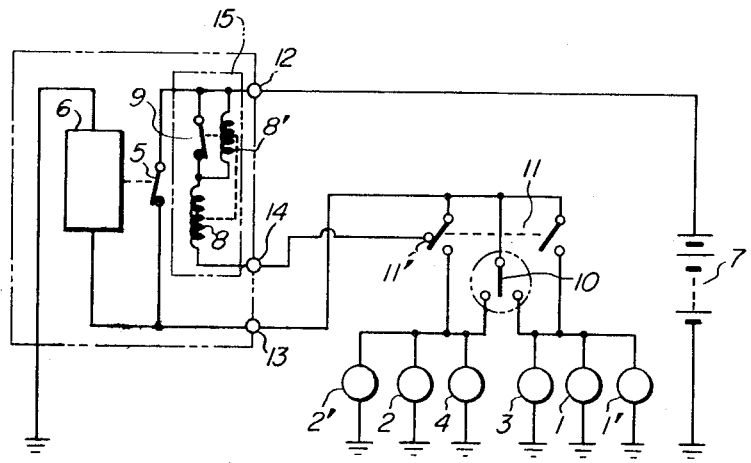
FIG. 2 is a block diagram of the electrical circuit in the switch device according to a first embodiment of the present invention.

In a first embodiment shown in FIG. 2, numerals 1 to 4 denote automobile direction indicator lights, which consists of right-hand direction indicator lights 1, 1', 3 and left-hand direction indicator lights 2, 2', 4. Numeral 5 represents a normally closed contact actuated by a switch actuator 6, which may be of the type utilizing the charging and discharging of a capacitor or the type utilizing the expansion and contraction of a hot wire. Numeral 7 denotes a power source, 8 a current winding, and 8' a voltage winding. Both windings 8 and 8' are wound on a common iron core so that their magnetomotive forces are added to each other. Numeral 9 shows a normally closed contact driven by the windings 8 and 8'. These windings 8 and 8' together with the normally closed contact 9 constitute a load detector 15. Numeral 10 denotes a direction indicator switch, 11 an emergency switch, 11' a normally closed contact to be opened with the closure of the emergency switch 11, 12 a power source terminal, 13 a load terminal, and 14 a load current detection terminal.

In operation, if, for example, the direction indicator switch 10 is leftwardly closed to effect the indication of a leftward turn of the vehicle, current flows into switch actuator 6 through the normally closed contact 5 while current also flows into the left-hand direction indicator lights 2, 2', 4 which are turned on thereby. After a predetermined time the switch actuator 6 opens the normally closed contact 5 and consequently, current flows in the circuit of winding 8 through the normally closed contact 9, so that the normally closed contact 9 is opened by the magnetomotive force of the winding 8. After the contact 9 is opened, it is maintained open by the electromotive force of the windings 8 and 8' with the result that, the normally closed contacts 5 and 9 now both being open, only small current flows through the current and voltage windings into the left-hand direction indicator lights 2, 2', 4, but the lights are not lighted thereby. Subsequently, after a predetermined time, the switch actuator 6 closes the normally closed contact 5 to thereby turn on the left-hand direction indicator lights 2, 2', 4 again. Concurrently therewith, the circuit of windings 8 and 8' is short-circuited to allow the normally closed contact 9 to close again. These operations are repeated to alternately turn on and off the left-hand direction indicator lights.

Description will now be made of the case where one of the left-hand direction indicator lights 2, 2', 4 is disconnected by a fault. With the direction indicator switch 10 closed leftwardly, the remaining sound ones of the left-hand direction indicator lights 2, 2', 4 are turned on while the actuator 6 opens the normally closed contact 5 after a predetermined time. This causes current to flow in the circuit of winding 8 and winding 8', but the magnetomotive force of the current winding 8 prevents the normally closed contact 9 from being opened because the current flowing in the aforementioned circuit is reduced by the cutoff of one of the direction indicator lights. As a result, the normally closed contact 9 is maintained closed. Therefore, the remaining direction indicator lights are kept turned on by the current passing through the normally closed contact 9 and current winding 8 even if the normally closed contact 5 is open. Thus, the driver of the vehicle can recognize the disconnection of one of the direction indicator lights from the fact that an indicator lamp (not shown) located in the vehicle cabin and connected in parallel with the direction indicator lights remains turned on.

The circuit of current winding 8 and voltage winding 8' is functionable always after the normally closed contact 5 is opened, that is, after the direction indicator lights are lit for a predetermined time. Therefore, at the point of time when the circuit starts operation, the temperature of the direction indicator lights and therefore their resistance assume a substantially steady-state value. This means that a substantially steady-state current flows in the current winding 8 from the beginning to substantially prevent the direction indicator lights from being affected by the surge current flowing thereinto just after the lights are turned on. Thus, the disconnection of one of the direction indicator lights can be reliably detected in a three-light type direction indicator device according to the present invention.

Figure 4:
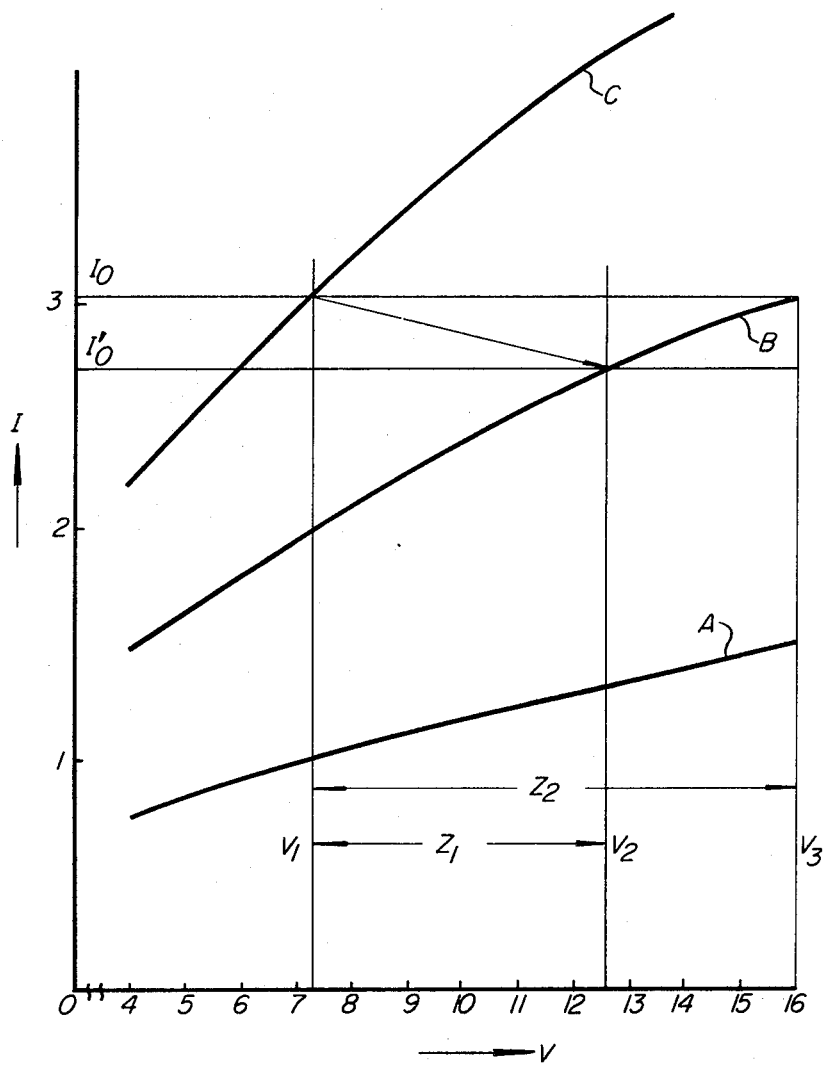
FIG. 4 is a graph illustrating the voltage characteristic of the current flowing in the ordinary electric lamps.

With reference to FIG. 4, description will now be made of the detection of the failure of the one of the direction indicator lights by the present invention in comparison with that by the prior art. In FIG. 4 illustrating the voltage characteristic of the current flowing in the electric lights, the vertical axis represents current I and the horizontal axis voltage V. Letter "A" represents the current for one of the direction indicator lights, "B" the current for two of them, and "C" the current for three of them. In the device according to the prior art, assume that $I_0$ is the minimum current value required for the normally open contact 9 to be closed by the magnetomotive force of the current winding 8 when all of the three direction lights are lit. Then the minimum current value required for the normally open contact 9 to be closed by the magnetomotive force of the current winding 8 when one of the direction indicator lights goes off or when two of them are lit, assumes a value $I_0'$ which is smaller than $I_0$. This is because in order that the current may be $I_0$ when one of the direction indicator lights goes off, the voltage must exceed $V_1$ which is the voltage when the current is $I_0$ under the normal condition of the direction indicator lights, and this voltage increase causes the surge current appearing after the turn-on of the direction indicator lights to increase in accordance with the voltage increment and thereby the current winding 8 closes the normally open contact 9 even if the steady-state current is of a value $I_0'$ which is smaller than $I_0$. Therefore, in the three-light type direction indicator device according to the prior art, $Z_1$ is the operating voltage range over which the cutoff of one of the direction indicator lights can be detected.

In contrast, the device of the present invention is operated always by the steady-state current of the direction indicator lights without influence of the surge current. Assuming that $I_0$ is the minimum current value required for the normally closed contact 9 to be opened by the magnetomotive force of the current winding 8 under the normal condition of the direction indicator lights, then the same minimum current $I_0$ is required for the normally closed contact 9 to be opened by the magnetomotive force of the current winding 8 even when one of the direction indicator lights goes off. Thus, in the three-light type direction indicator device of the present invention, the operating voltage range over which the failure of one of the direction indicator lights can be detected is $Z_2$ covering the voltage between $V_1$ and $V_3$. This operating voltage range $Z_2$ is the maximum width determined by the voltage characteristic of the electric lights, which means that the device according to the present invention enables the failure of one of the lights to be detected over the theoretically greatest possible range. In this way, the present invention ensures the failure of one of the direction indicator lights to be detected over a wide voltage range practically required in a three-light type direction indicator device.

If it is necessary to produce an emergency signal to prevent any danger from taking place when the vehicle stops due to its trouble or in similar cases, the emergency switch 11 (FIG. 2) is closed to connect all of the left-hand and right-hand direction indicator lights with the load terminal 13 and to open the normally closed contact 11'. As a result, the circuit of current winding 8 and voltage winding 8' is disconnected from the power source 7 and dissociated with the ON-OFF operation as will be described. On the other hand, the switch actuator 6 operates independently of the magnitude of the load and therefore the direction indicator lights turn on and off at a predetermined number of intervals irrespective of the number of such lights in use. Moreover, as the circuit of current winding 8 and voltage winding 8' is disconnected from the power source 7 as described previously, and gives no influence to the lighting operation, the direction indicator lights continue to flash to produce an emergency signal, until the last one of the lights finally goes off.

In the embodiment described above, the contact 5 driven by the switch actuator 6 has been described as a normally closed contact. However, it may be a normally open contact. In the latter case, the normally open contact 5 is closed to turn on the direction indicator lights and, after a predetermined time, the normally open contact is opened to cause the load detector circuit comprising the current winding 8, voltage winding 8′ and normally closed contact 9 to effect the normal load detection.

Figure 3:
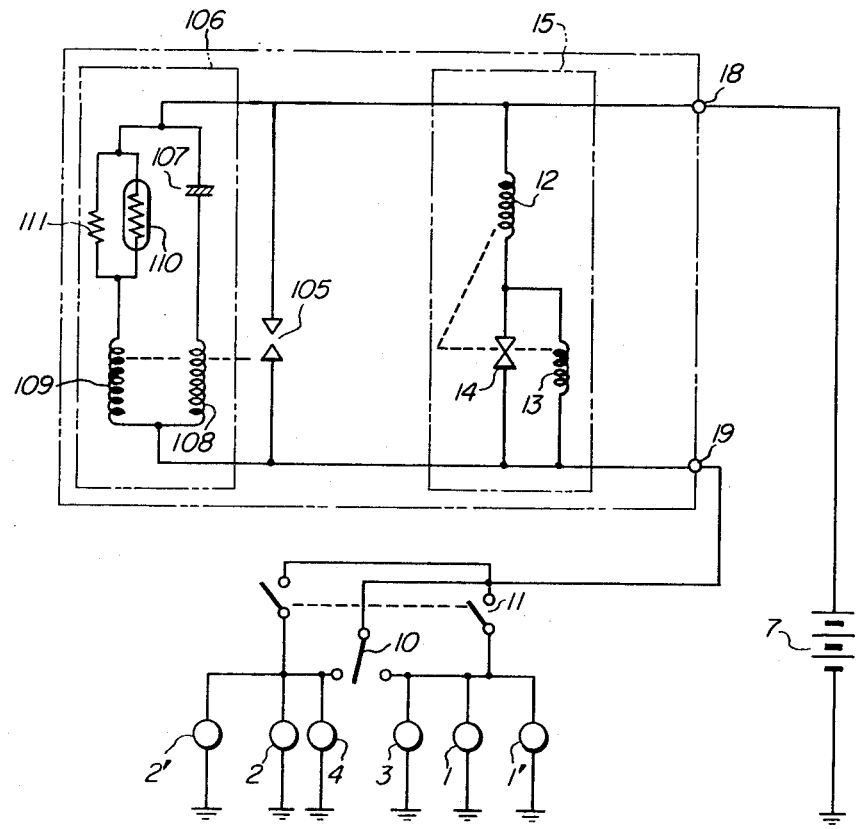
FIG. 3 is a block diagram showing the electrical circuit of the switch device according to a second embodiment of the present invention.

In a second embodiment of the present invention as shown in FIG. 3, numerals 1 to 4 denote automobile direction indicator lights, of which 1, 1′, 3 are right-hand direction indicator lights and 2, 2′, 4 are left-hand direction indicator lights. Numeral 105 is a normally open contact driven by a switch actuator 106. The driven-type switch actuator 106 shown in FIG. 3 is of the type utilizing the charging and discharging of a capacitor 107, and comprises voltage windings 108 and 109 wound in such a manner that their magnetomotive forces are offset by each other, a thermistor 110 and a resistor 111. Numeral 12 represents a current winding and 13 a voltage winding, these windings 12 and 13 being wound on a common iron core so that their magnetomotive forces are added to each other. Numeral 14 denotes a normally closed contact driven by the windings 12 and 13. The windings 12 and 13 and the normally closed contact 14 together constitute a load detector 15. Use is further made of a single-pole double-throw type direction indicator switch 10, a double-pole single-throw type emergency switch 11, a power source terminal 18, a load terminal 19 and a power source 7.

In operation, the direction indicator switch 10 is closed, for example, leftwardly to indicate the leftward turn of the vehicle. It causes a current to flow into the voltage winding 108 through the capacitor 107 in the switch actuator 106 while causing a current to flow into the voltage winding 109 through the parallel circuit of thermistor 110 and resistor 111, and thereby the magnetomotive forces of the windings 108 and 109 are offset by each other to maintain the normally open contact 105 open. On the other hand, in the load detector 15, the normally closed contact 14 is opened by the magnetomotive force of the current winding 12, and once opened, the contact 14 is maintained open by the sum of the magnetomotive forces of the current winding 12 and voltage winding 13. This allows only a small current passing through the voltage windings 108, 109 and simultaneously another small current passing through windings 12, 13 to flow into the direction indicator lights 2, 2′, 4 but none of these lights will be lit. However, as the capacitor 107 is gradually charged, the current in the voltage winding 108 is decreased to break the balance between the magnetomotive forces of the voltage windings 108 and 109 after a certain time, and the normally open contact 105 is closed by the magnetomotive force of the voltage winding 109. Thereupon a voltage substantially equal to the source voltage is applied to the left-hand direction indicator lights 2, 2′, 4 through the contact 105 so that these direction indicator lights are lit. The normally open contact 105 is maintained closed while the electric charge of the capacitor 107 is discharged. On the other hand, the load detector 15 is short-circuited upon closing of the normally open contact 105 to thereby return the normally closed contact 14 to its closed position. Thereafter, the charging and discharging of the capacitor 107 are repeated to open and close the normally open contact 105 so as to flash the left-hand direction indicator lights 2, 2′, 4. The thermistor 110 and resistor 111 are used for temperature compensation.

When one of the left-hand direction indicator lights 2, 2′, 4 goes off, current flows in the circuit of the current winding 12 and normally closed contact 14 of the load detector 15 if the direction indicator switch 10 is closed, but the current is reduced by the current of one of the direction indicator lights and the current winding 12 fails to open the normally closed contact 14, which thus remains closed.

Therefore, even if the normally open contact 105 is maintained open, the remaining direction indicator lights remain lit by the current passing through the normally closed contact 14 and current winding 12. Thus, the driver of the vehicle can recognize the failure of one of the direction indicator lights from the fact that an indicator lamp (not shown) located in the vehicle cabin and connected in parallel with the direction indicator lights remains lit.

Since the circuit of current winding 12 and voltage winding 13 always operates after the normally open contact 105 is opened or after the direction indicator lights are lit for a certain time, the temperature of the filament of the direction indicator lights is already raised when the said circuit operates, and the resistance of these lights assumes a substantially steady-state value. Therefore, a substantially steady-state current flows in the current winding 12 from the beginning without substantial influence of the surge current flowing just after the direction indicator lights are turned on. This ensures the failure of one of the lights to be detected in a three-light type direction indicator device as shown in this embodiment. Although the rush current of the direction indicator lights flows in the load detector 15 to open the normally closed contact 14 just after the direction indicator switch 10 is closed, no surge current flows in the load detector 15 during the next opening of the normally open contact 105 because the direction indicator lights are already lit by that time. Therefore, the normally closed contact 14 is not opened but remains closed thereafter, and no inconvenience is caused to indicate the failure of one of the lights. In this case, the fact that the normally closed contact 14 maintains its closed position makes it possible to prevent any unnecessary on-off operation of the switch actuator 106.

It holds true with this embodiment, as with the first embodiment previously described, that the failure of one of the direction indicator lights in a three-light type direction indicator device can be reliably detected over the theoretically greatest possible range of the source voltage.

Further, where it is necessary to produce an emergency signal to prevent any danger from occurring when the vehicle stops due to a breakdown or in a similar case, the emergency switch 11 should be closed to connect all the right-hand and left-hand direction indicator lights with the load terminal 19. In this case, the switch actuator 106 operates independently of the magnitude of the load and therefore the direction indicator lights are flashed at a predetermined number of intervals irrespective of the number of such lights in use.

Moreover, since the switch actuator 106 is connected in parallel with the normally open contact 105 both during the above-described direction indication and during an emergency, power is supplied from the power source 7 to the switch actuator 106 when the normally open contact 105 is opened, that is, when there is no load. Thus, the capacitor 107 of the switch actuator 106 can store no-load voltage of the source voltage and thereby can drive the normally open contact 105 with the maximum voltage available from the power source 7, resulting in reliable operation of the device.

I claim:

1. In a direction indicating and hazard flasher device for automobiles comprising a power source, indicator means including two groups of lamp loads for indication of turning directions selectively, a direction indicator switch connected to said indicator means for selectively connecting either group of lamp loads to said power source through switching means, and a hazard switch connected to said indicator means for simultaneously connecting said two groups of lamp loads to said power source through said switching means; the improvement wherein said switching means comprises:

a first contact connected between said direction indicator switch and said power source, a switch actuator to be energized from said power source for periodically actuating said first contact, a series circuit of a second normally closed contact and a current winding, said series circuit being connected in parallel with said first contact through a third normally closed contact which is conversely interlocked with said hazard switch, and a voltage winding connected in parallel with said second normally closed contact, said current winding being adapted to open said second normally closed contact only when the current therein is larger than a predetermined value, and said voltage winding being arranged to hold said second normally closed contact in the opened state in cooperation with said current winding.

2. In a direction indicating and hazard flasher device for automobiles comprising a power source, indicator means including two groups of lamp loads for indication of turning directions selectively, a direction indicator switch connected to said indicator means for selectively connecting either group of lamp loads to said power source through switching means, and a hazard switch connected to said indicator means for simultaneously connecting said two groups of lamp loads to said power source through said switching means; the improvement wherein said switching means comprises:

a first contact connected between said direction indicator switch and said power source;

a switch actuator connected in parallel with said first contact and periodically actuating said first contact when energized;

and a load detector comprising a series circuit of a second normally closed contact and a current winding, said series circuit being connected in parallel with said first contact and a voltage winding connected in parallel with said second contact, said second normally closed contact being opened by said current winding only when a current larger than a predetermined value is supplied thereto from said power source and being held in the opened state by said current winding in cooperation with said voltage winding.

* * * * *